Patented Jan. 9, 1934

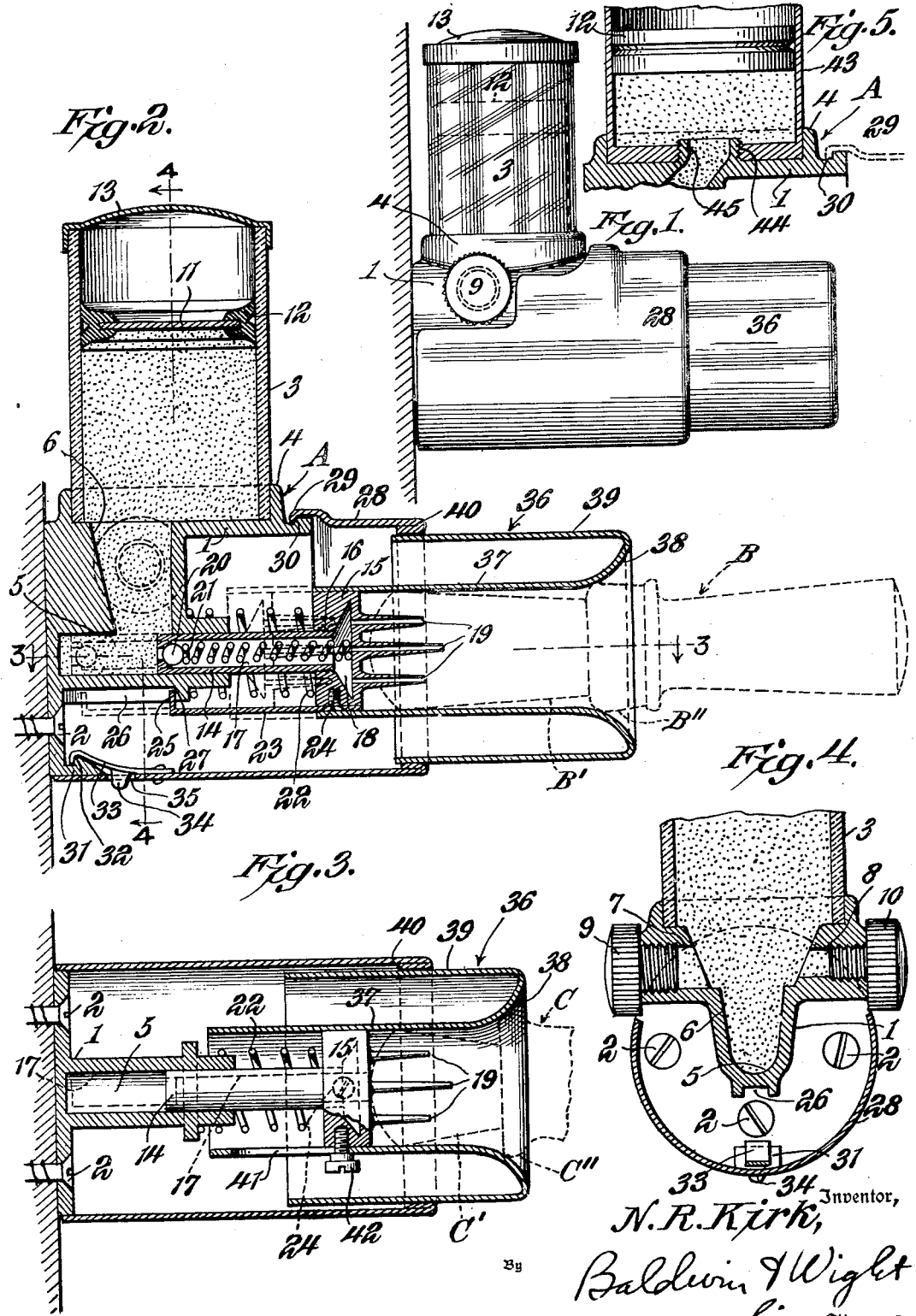

1,942,556

UNITED STATES PATENT OFFICE 1,942,556

DISPENSING APPARATUS

Noel R. Kirk, Tientsin, China

Application May 23, 1932. Serial No. 613,051

9 Claims. (Cl. 221—102)

This invention relates to dispensing apparatus, and more particularly to apparatus for dispensing shaving cream and delivering it to the bristles of a brush or the like. Apparatus embodying the invention is especially adapted for the delivering of shaving cream to the interior of the bristles of shaving brushes as distinguished from merely depositing the cream upon the ends of the bristles.

By far the greater amount of shaving cream sold is put up in collapsible metal tubes provided with screw caps. In the use of such tubes it is necessary to remove the cap from the tube and to squeeze the cream out upon the brush, or upon the fingers of the user for application directly to the face. When delivered to the bristles of the brush, the cream often falls off, either before the bristles touch the user's face or even after lathering has been commenced. After the desired amount of cream has been expelled from the tube, more usually oozes out before the cap is replaced, which results in an undesirable accumulation of cream around the discharge nozzle. Moreover, the cap is lost easily, and, when the tube nozzle is left uncovered, the cream has a decided tendency to harden in the nozzle, necessitating the application of greater pressure than usual in order to extrude cream from the tube, frequently resulting in the bursting of the tube and wasting of cream.

An object of the present invention is to provide an apparatus for dispensing shaving cream or the like so constructed and arranged to operate in such a manner as to avoid the undesirable occurrences attending the use of ordinary collapsible tubes.

Another object is to provide a dispensing apparatus adapted to deliver shaving cream or the like to the interior of the bristles of the brush as distinguished from merely depositing the cream on the ends of the bristles.

A further object is to provide an apparatus adapted to be operated by thrust exerted by the body or handle of the shaving brush to deliver shaving cream to the bristles of the brush. Other objects will become apparent from a reading of the following description, the appended claims, and the several views of the accompanying drawing, in which:

Figure 1 is a view in side elevation of an apparatus embodying the invention;

Figure 2 is a central vertical longitudinal sectional view of the apparatus, drawn on an enlarged scale;

Figure 3 is a horizontal sectional view taken on the line 3—3 of Figure 2;

Figure 4 is a vertical sectional view taken on the line 4—4 of Figure 2, the top part of a reservoir being broken away; and Figure 5 is a fragmentary horizontal vertical sectional view of a modified form of apparatus showing a detachable and replaceable reservoir, the top part of the latter being broken away.

In the drawing, which illustrates preferred practical embodiments of the invention, there is shown a container generally designated A and including a body 1 formed preferably of metal and being adapted to be secured to a wall by means of screws 2, and a reservoir 3 which is preferably cylindrical and of glass, the lower end of which is seated on top of the body 1 and within an upwardly extending circular flange 4 formed on the body.

The body 1 is formed with a cylinder 5 closed at its inner or left hand end and open at its opposite end, the cylinder being adapted to communicate with the reservoir 3 by means of an inlet opening 6 also formed in the body 1.

Two filler openings 7 and 8 extend inwardly from the sides of the body 1 and open into the inlet opening 6 so as to communicate with the interior of the reservoir 3. These openings preferably are of different diameters and are internally threaded at their outer ends for the reception of the exteriorly threaded nozzles of conventional collapsible shaving cream tubes. Threaded closure plugs 9 and 10 are provided for closing the filler openings 7 and 8 after the reservoir 3 has been filled.

A follower 11 provided with a peripheral rubber washer 12 is mounted for sliding movements in the reservoir 3 and serves to prevent the material in the reservoir from being in contact with the atmosphere, so as to avoid oxidation of the material. A removable cap or cover 13 is fitted upon the upper end of the reservoir to prevent dust from collecting on the follower 11.

By providing the follower and by locating the filler openings at the lower end of the reservoir, contact of the shaving cream with the air before delivery is entirely prevented. As cream is forced in through one or the other of the filler openings, it will cause the follower to rise so as to make room for the cream, but the latter will not come in contact with air from the time it leaves the collapsible tube or other source of supply until it is delivered for use.

In accordance with one feature of the invention, I provide means for forcing material from the container and delivering it directly to the bristles of the shaving brush. In the form shown, this means comprises a piston 14 mounted for reciprocation within the cylinder 5 and provided at its outer end with a head 15 having threaded connection with the piston as at 16. A discharge passage 17 formed within the piston is adapted to communicate at its inner end with the cylinder 5, and at its outer end opens into the chamber 18 formed in the head 15, the chamber 18 in turn communicating with a plurality of spaced outwardly extending delivery nozzles 19. These nozzles preferably are thin, i. e. of small diameter and somewhat elongated so as to be capable of penetrating and extending deeply into the bristles of a brush to which shaving cream is to be delivered.

A ball valve 20 urged to closed position by means of a spring 21 interposed between the ball valve and the outer end of the head 15 controls communication of the cylinder with the discharge passage 17, and a spring 22 surrounding the piston and being disposed between the body 1 and the head 15 urges the piston and head outwardly with respect to the cylinder 5. A strip 23 secured to the lower side of the head by means of a screw 24 is formed with an upturned end 25 movable in a slot 26 in the bottom of the body 1 and engageable with the end 27 of the slot for limiting outward movement of the piston and the head.

In operation, assuming the piston 14 and head 15 to be in the position shown in Figure 2, the inlet opening 6 and cylinder 5 will be filled with shaving cream. To deliver cream through the nozzles 19, the head and piston are moved to the left. As soon as the inner end of the piston passes the inner side of the inlet opening 6 so as to cut off the latter from communication with the cylinder, the ball valve 20 will be forced open and shaving cream will be delivered through the passage 17, the chamber 18, and the nozzles 19.

In order to conceal the operating parts just described and to prevent the accumulation of dust thereon, I preferably provide a casing 28 open at its outer or right hand end and being mounted on the body 1 in surrounding relation to the operating parts. As shown, the casing is provided at its upper side with a clip 29 adapted to engage a notch 30 on the upper side of the body 1. The lower wall of the casing is arranged to fit under a bottom flange 31 on the body 1. The flange 31 is formed on its inner and upper face with a latch nose 32 which is engageable by a spring latch 33 secured to the inner face of the casing 28. Preferably the latch is provided with a button 34 extending through an opening 35 in the bottom wall of the casing to facilitate disengagement of the latch from the nose so as to permit removal of the casing when it is desired to adjust the operating parts in a manner to be described.

In accordance with a further feature of the invention, means are provided for engagement with the body of a brush whose bristles are disposed to encompass the ends of the nozzles 19 for actuation by thrust exerted by the brush body for expelling cream and delivering it into the interior of the bristles. In the form shown, this means comprises an operating member 36 formed to include a housing 37 the inner end of which is fitted over the head 15, an outwardly flared outer end part 38, and an apron 39 surrounding the housing 37 and being slidable within a guide formed by an inwardly folded flange 40 on the open end of the casing 28. As shown in Figure 3, the housing 37 is provided on one side with a slot 41 through which extends a locking screw 42 having threaded engagement with the head 15. For purposes to be set forth later, the housing is adjustable with respect to the head 15 in the direction of movement of the latter, and the screw 42 serves to lock the housing in the desired adjusted position.

In operation, assuming that the parts are in the positions shown in Figure 2, with the exception that the reservoir 3 is empty and the follower 11 is at the bottom of the reservoir, in order to render the apparatus ready for use, one or the other of the closure plugs 9 or 10 is removed, depending upon the size of the thread on the nozzle of the tube from which the cream is to be supplied to the container. The supply tube is then screwed into the opening 7 or 8, as the case may be, and the cream forced into the container by collapsing the tube in the usual manner. Material entering the container will contact with the bottom side of the follower and will move the latter upwardly. Thereafter air will not contact with the material, and oxidation of the latter will be prevented.

When it is desired to deliver shaving cream to the interior of the bristles of the shaving brush such as the brush B indicated in dotted lines in Figure 2, the bristles B' of the brush are inserted into the housing 37 and the brush moved inwardly until the body portion B'' thereof engages the flared end 38 of the member 36. The brush B shown in Figure 2 has relatively long bristles, and, in order to prevent the ends of the latter from being forced into engagement with the head 15, the housing 37 is so adjusted with respect to the head 15 that the flared end 38 is disposed relatively far from the head. This adjustment is effected by loosening the screw 42 and sliding the housing outwardly with respect to the head 15, after which the screw 42 is tightened so as to maintain the housing in the desired adjusted position. With the brush in the position shown in Figure 2, the nozzles 19 extend into the bristles B'. To deliver shaving cream to the interior of the bristles, the brush is moved to the left, so that the body part B'' exerts a thrust upon the flared outer end portion 48, thus moving the head 15 and piston 14 to the left. As previously stated, such movement of the piston will cause cream to be delivered through the passage 17 and the nozzles 19 into the bristles. When the desired amount of cream has been delivered, the brush B is withdrawn, permitting the parts to assume their figure 2 positions, after which the brush may be wet and the lather produced in the usual manner.

When the apparatus is employed for delivering shaving cream to a brush having relatively short bristles, such for instance as the brush C shown in Fig. 3, the locking screw 42 is loosened and the housing 37 is adjusted inwardly with respect to the head 15 so as to bring the housing and head to the relative positions shown in Figure 3, after which the locking screw 42 will be tightened to maintain the parts in the new adjusted position. With the parts in the new position, the body part C'' of the brush C will engage the flared end 38 of the housing while the bristles C encompass the delivery nozzles 19 without contacting with the head 15. The housing 37 serves not only to transmit thrust from the brush body to the head 15 and the piston 14, but serves also to confine the brush bristles and to hold them together around the discharge nozzles so as to prevent material emerging from the nozzles from being forced through the brush bristles.

In accordance with the modification shown in Figure 5, the filler openings 7 and 8 are omitted and a detachable reservoir 43 is used in place of the permanently mounted reservoir 3 shown in Figures 1, 2, and 4. The reservoir 43 is provided with an internally threaded bottom opening 44 adapted to receive an externally threaded fitting 45 on the upper end of the body 1, this fitting forming a continuation of the inlet opening 6 in the body. The detachable reservoir 43 may be removed when empty and replaced with another and like reservoir, thus doing away with the necessity of forcing cream into the container from the usual collapsible tube.

Although the illustrative forms of apparatus shown and described herein are considered to be preferred embodiments of the invention, it will be understood that various changes may be made in the specific construction and arrangement of the parts without departing from the scope of the invention as defined in the claims.

I claim:

1. Apparatus for dispensing material to a brush comprising a cylinder; a reciprocable hollow piston therein; a plurality of spaced thin elongated delivery nozzles on the outer end of said piston adapted to penetrate and extend into the interior of the bristles of a brush; a valved discharge passage providing communication between said cylinder and said delivery nozzles; and means for operating said piston.

2. Apparatus for dispensing material to a shaving brush comprising a cylinder; a piston reciprocably mounted therein; a head on the outer end of the piston; a plurality of spaced delivery nozzles carried by said head and extending outwardly therefrom; a discharge passage extending through said piston and head and communicating with said nozzles; and means for operating said piston to deliver material to the interior of the bristles of a brush comprising a housing connected to said head and being adapted to confine the bristles about said nozzle, the outer end of said housing being engageable by the brush body for transmitting a thrust to said head.

3. Apparatus for dispensing material to a shaving brush comprising a cylinder; a piston reciprocably mounted therein; a head on the outer end of the piston and provided with a delivery opening; a valved discharge passage extending through said piston and head and communicating with said delivery opening; and means for operating said piston to deliver material to the bristles of a brush comprising a housing connected to said head and being adapted to confine the brush bristles in position to receive material discharge through said opening, the outer end of said housing being flared outwardly to facilitate introduction of the bristles into said housing, said outwardly flared part being engageable by the brush body for transmitting a thrust to said head and piston.

4. Apparatus for dispensing material to a shaving brush comprising a cylinder; a piston reciprocably mounted therein; a head on the outer end of the piston and provided with a delivery opening; a discharge passage extending through said piston and head and communicating with said delivery opening; means for operating said piston to deliver material to the bristles of a brush comprising a housing mounted for adjustment longitudinally of said piston and being adapted to confine the brush bristles in position to receive material discharged through said opening, the outer end of said housing being engageable by the brush body for transmitting a thrust to said head and piston; and means for securing said housing to said head in adjusted position.

5. Apparatus for dispensing material to a shaving brush comprising a body formed with a cylinder; a piston reciprocably mounted therein; a head on the outer end of the piston; a delivery nozzle carried by said head and extending outwardly therefrom; a discharge passage extending through said piston and head and communicating with said nozzle; a spring for urging said piston to its outer position; an open end casing carried by said body and surrounding said piston, head, and spring; and a member for operating said piston comprising a housing part extending through the open end of said casing and being connected to said head to confine the bristles of a brush about said nozzle, and an apron part surrounding said housing and having sliding engagement with said casing.

6. Apparatus for dispensing material to a shaving brush comprising a body formed with a cylinder; a piston reciprocably mounted therein; a head on the outer end of the piston; a delivery nozzle carried by said head and extending outwardly therefrom; a discharge passage extending through said piston and head and communicating with said nozzle; a spring for urging said piston to its outer position; an open end casing carried by said body and surrounding said piston, head, and spring; a member for operating said piston comprising a housing part extending through the open end of said casing for connection to said head in adjusted position with respect thereto and being adapted to confine the bristles of a brush about said nozzle, and an apron part surrounding said housing and having sliding engagement with said casing; and means for securing said member to said head in adjusted positions.

7. Apparatus for dispensing material to a shaving brush comprising a container; a reciprocable head; an elongated delivery nozzle carried by said head and being adapted to extend into the interior of the bristles of a brush; means providing a passage-way between said container and said nozzle; expelling means actuated by movement of said head for expelling material through said passage-way and said nozzle; and a member extending in the direction of movement of said head and being connected thereto in adjusted position, the outer end of said member being engageable by the body of a brush whose bristles are disposed to encompass said nozzle with the ends of the bristles being spaced from said head.

8. Apparatus for dispensing material to a shaving brush comprising a container including a cylinder body and a replaceable reservoir; a reciprocable head; an elongated delivery nozzle carried by said head and being adapted to extend into the interior of the bristles of a brush; means providing a passage-way between said container and said nozzle; expelling means actuated by movement of said head for expelling material through said passage-way and said nozzle; and a member extending in the direction of movement of said head and being connected thereto in adjusted position, the outer end of said member being engageable by the body of a brush whose bristles are disposed to encompass said nozzle with the ends of the bristles being spaced from said head.

9. Apparatus for dispensing material to a brush comprising a container, means for expelling material from said container including a movably mounted operating member; and an elongated delivery nozzle mounted on said member to move therewith, said nozzle communicating with said container and opening in a direction parallel to the line of movement of said member, said operating member being provided with a surface located outwardly beyond the discharge end of said nozzle for engagement by the body of a brush positioned with its bristles encompassing and loosely contacting said nozzle.

NOEL R. KIRK.